United States Patent
Bala et al.

(10) Patent No.: US 6,725,335 B2
(45) Date of Patent: Apr. 20, 2004

(54) METHOD AND SYSTEM FOR FAST UNLINKING OF A LINKED BRANCH IN A CACHING DYNAMIC TRANSLATOR

(75) Inventors: Vasanth Bala, Sudbury, MA (US); Evelyn Duesterwald, Somerville, MA (US); Sanjeev Banerjia, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 09/755,780

(22) Filed: Jan. 5, 2001

(65) Prior Publication Data

US 2001/0042173 A1 Nov. 15, 2001

Related U.S. Application Data

(60) Provisional application No. 60/184,624, filed on Feb. 9, 2000.

(51) Int. Cl.⁷ .................. G06F 12/00; G06F 9/44; G06F 11/00; G06F 9/00; G06F 15/00
(52) U.S. Cl. .................. 711/125; 711/118; 717/9; 712/233; 712/237; 714/35
(58) Field of Search .................. 711/125, 118, 711/133; 712/233, 234, 235, 236, 239, 237, 238, 240, 205; 714/35; 717/9

(56) References Cited

U.S. PATENT DOCUMENTS 5,815,720 A * 9/1998 Buzbee .................. 395/709
5,949,995 A * 9/1999 Freeman .................. 395/586
6,185,669 B1 * 2/2001 Hsu et al. .................. 712/205
6,205,545 B1 * 3/2001 Shah et al. .................. 712/237
6,237,065 B1 * 5/2001 Banerjia et al. .................. 711/133
6,295,644 B1 * 9/2001 Hsu et al. .................. 717/9
6,330,691 B1 * 12/2001 Buzbee et al. .................. 714/35
6,453,411 B1 * 9/2002 Hsu et al. .................. 712/237

OTHER PUBLICATIONS

Bob Cmelik, et al.: "Shade: A Fast Instruction–Set Simulator for Execution Profiling"; SIGMETRICS 94–5/94; pp 128–137.
Thomas Ball, et al.; "Branch Prediction for Free"; ACM–SIGPLAN–PLDI–6/93; pp 300–313.
Thomas Ball, et al.; "Efficient Path Profiling"; 1072–4451/96 IEEE; pp 46–57.

* cited by examiner

Primary Examiner—Kimberly McLean-Mayo

(57) ABSTRACT

In a system and method for linking and unlinking code fragments stored in a code cache, a memory area is associated with a branch in a first code fragment that branches outside the cache. If the branch can be set to branch to a location in a second code fragment stored in the cache, branch reconstruction information is stored in the memory area associated with the branch, and the branch instruction is updated to branch to the location in the second code fragment, thereby linking the first code fragment to the second code fragment. If it is determined that the previously linked branch should be unlinked, the first and second code fragments at that branch are unlinked by reading the information stored in the associated memory area at the time of linking, and using that information to reset the branch to its state prior to the linking.

46 Claims, 7 Drawing Sheets

```
spill Ra
load Ra, translator-entry
ble Ra, Rb
```

FIG. 2

METHOD AND SYSTEM FOR FAST UNLINKING OF A LINKED BRANCH IN A CACHING DYNAMIC TRANSLATOR

RELATED APPLICATIONS

This application claims priority to provisional U.S. application Ser. No. 60/184,624, filed on Feb. 9, 2000, the content of which is incorporated herein in its entirety.

FIELD OF THE INVENTION

The present invention relates generally to runtime linking and unlinking, and more particularly to a system and method for unlinking a branch linking code fragments in a caching dynamic translator during runtime.

BACKGROUND OF THE INVENTION

Caching dynamic translators use a code cache to store native optimized translations of frequently executed code fragments, which reduces emulation overhead and improves performance. When a branch instruction is reached in a fragment in the code cache, processing exits from the code cache. In instances where the branch instruction branches to another fragment in the code cache, there is a context switch from processing in the code cache to outside the code cache and back into the cache. These context switches in and out of the code cache are expensive.

To avoid these expensive context switches, it is possible to link or "backpatch" branches that exit the cache only to jump right back into another code fragment that is already in the cache. Linking minimizes the expensive context switches necessary for implementing the cache exits and entries. Linking fragments in the code cache also results in some problems.

The contents of the code cache typically change with the working set of the application program. It is therefore desirable to be able to remove older fragments as newer ones enter the code cache. Any fragment being removed from the code cache, which has been previously linked to another fragment in the code cache, needs to be unlinked. Branch unlinking adds to the overhead of dynamic translation. If unlinking is too expensive to be feasible at runtime, the system has to compensate for the inability to quickly remove fragments by enlarging the size of the code cache, which becomes undesirable after a certain point.

SUMMARY OF THE INVENTION

Briefly, in a dynamic translator in which code fragments are stored in a cache, a method for linking and unlinking a first code fragment stored and a second code fragment in the cache comprises associating a memory area with a branch in a first code fragment that branches outside of the cache, and storing at least one instruction in the memory area that is executed when the branch is taken and control is to transfer to code outside of the cache. If it is determined that the branch can be set to branch to a location in a second code fragment stored in the cache, information is stored in the associated memory area from which the branch can be reconstructed in response to the determination, and the branch is changed so that it branches to the second code fragment stored in the code cache, thereby linking the first and second code fragments.

In another aspect of the present invention, if it is determined that the branch from the first code fragment to the second code fragment should be unlinked, the branch is reconstructed to its state before linking based on the information stored in the associated memory area.

In yet another aspect of the present invention, a method for linking and unlinking code fragments stored in a code cache comprises associating a memory area with a branch in a first code fragment that branches outside the cache. If it is determined that the branch can be set to branch to a location in a second code fragment stored in the cache, branch reconstruction information is stored in the memory area associated with the branch, and the branch instruction is updated to branch to the determined location in the second code fragment, thereby linking the first code fragment to the second code fragment.

BRIEF DESCRIPTION OF THE DRAWINGS

FIG. 2 shows an example of a trampoline block consistent with the present invention.

DETAILED DESCRIPTION OF THE PREFERRED EMBODIMENT

Caching dynamic translators attempt at runtime to identify program hot spots, which are frequently executed portions of the program, such as certain loops. A code cache may be used to store translations of the frequently executed portions. Subsequent execution of the portions can use the cached translations, which reduces the overhead of executing the portions of the program. The frequently executed portions are called fragments, which are single-entry multi-exit dynamic sequences of blocks. A block is a branch-free sequence of code that terminates with a branch.

To identify fragments and store them in a code cache, the caching dynamic translator uses traces. Traces may pass through several procedure bodies, and may even contain entire procedure bodies. Traces offer a fairly large optimization scope while still having simple control flow, which makes optimizing them much easier than a procedure. Simple control flow also allows a fast optimizer implementation. A dynamic trace can even go past several procedure calls and returns, including dynamically linked libraries (DLLs). This allows an optimizer to perform inlining, which is an optimization that removes redundant call and return branches, which can substantially improve performance.

Figure 1:
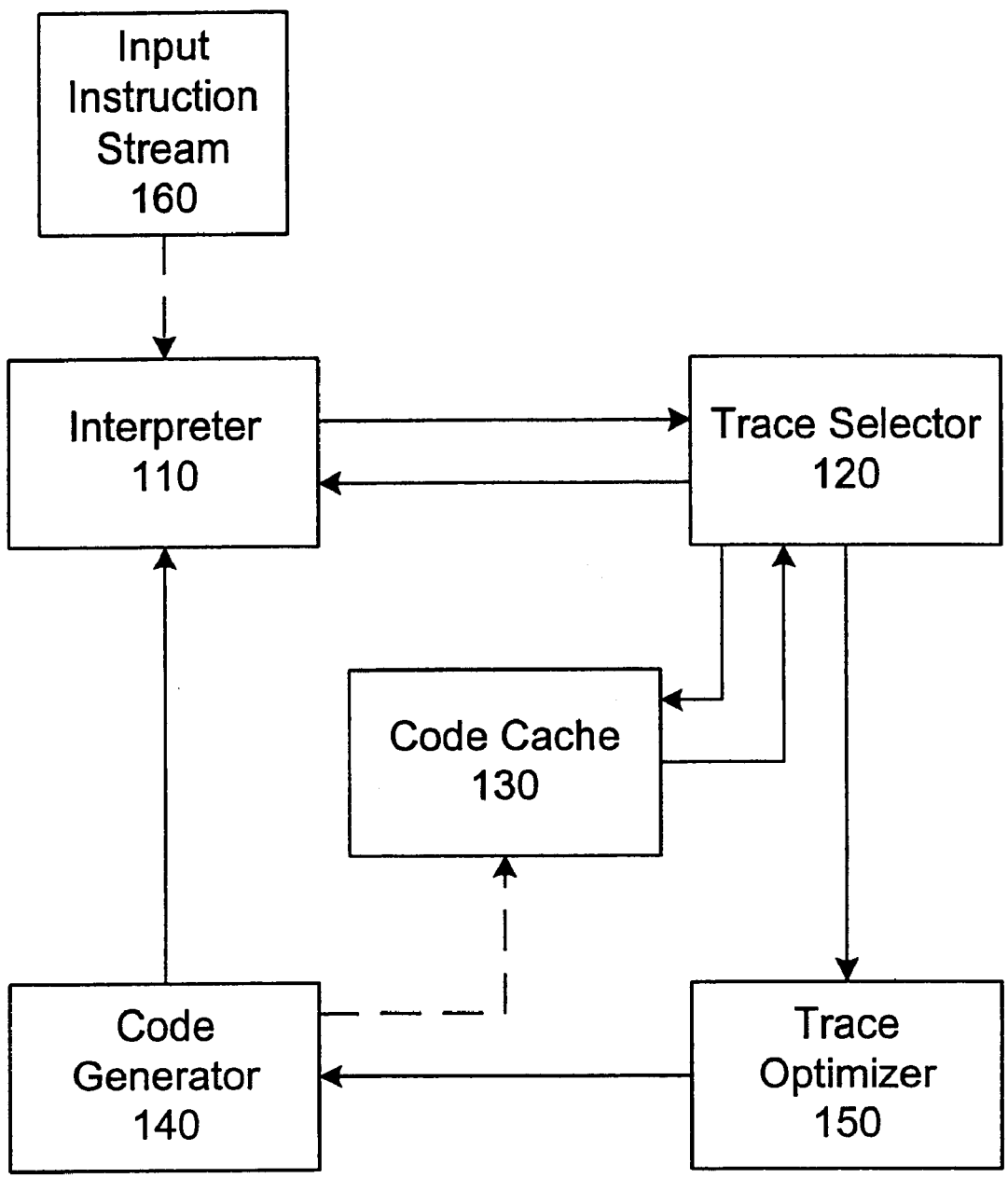
FIG. 1 shows a block diagram of a dynamic translator consistent with the present invention.

Referring to FIG. 1, a dynamic translator includes an interpreter 110 that receives an input instruction stream 160. This "interpreter" represents the instruction evaluation engine. It can be implemented in a number of ways, such as a software fetch-decode-eval loop, a just-in-time compiler, or even a hardware CPU.

In one aspect of the present invention, the instructions of the input instruction stream 160 are in the same instruction set as that of the machine on which the translator is running, i.e., a native-to-native translation. In the native-to-native case, the primary advantage obtained by the translator flows from the dynamic optimization 150 that the translator can perform. In another aspect of the present invention, the input instructions are in a different instruction set than the native instructions.

The trace selector 120 identifies instruction traces to be stored in the code cache 130. The trace selector is the component responsible for associating counters with interpreted program addresses, determining when to switch between interpreter states, and determining when a "hot trace" has been detected. The interpreter states may be switched between a normal mode and a trace growing mode.

Much of the work of the dynamic translator occurs in an interpreter-trace selector loop. After the interpreter 110 interprets a block of instructions, i.e., until a branch, control is passed to the trace selector 120 to make the observations of the program's behavior so that it can select traces for special processing and placement in the code cache 130. The interpreter-trace selector loop is preferably executed until one of the following conditions is met: (a) a cache hit occurs, in which case control jumps into the code cache, or (b) a hot start-of-trace is reached.

When a hot start-of-trace is found, the trace selector 120 switches the state of the interpreter 110 so that the interpreter emits the trace instructions until a corresponding end-of-trace condition is met. A start-of-trace condition may be, for example, a backward taken branch, procedure call instructions, exits from the code cache 130, system call instructions, or machine instruction cache misses. An end-of-trace condition may occur when, for example, a certain number of branch instructions have been interpreted since entering the grow trace mode, a backward taken branch is interpreted, or a certain number of native translated instructions has been emitted into the code cache 130 for the current trace.

After emitting the trace instructions, the trace selector 120 invokes the trace optimizer 150. The trace optimizer 150 is responsible for optimizing the trace instructions for better performance on the underlying processor. After optimization is completed, the code generator 140 emits the trace code as a fragment into the code cache 130 and returns to the trace selector 120 to resume the interpreter-trace selector loop.

The process of transforming a trace into a fragment is called fragment formation. Fragment formation involves the adjustment of taken branches on the trace and the generation of exit blocks. Since a trace may contain several taken branches, the resulting code fragment has a single-entry and multiple-exits with a shape similar to a tree, except that a fragment may contain loops where the fragment head is the loop back edge target.

Every taken branch in the code cache 130 typically exits the code cache 130 and traps into the instruction stream 160 executed by the interpreter 110. This trapping is typically implemented by generating a trampoline block having a sequence of instructions, which save the code cache context in memory, load the context of the interpreter 110, and jump to one of the entry points of the interpreter 110. When using a trampoline block, the taken target of a branch in the code cache 130 is the sequence of instructions in the trampoline block.

Trampoline blocks, which may be inserted for every exiting branch in a fragment, are responsible for initiating the transfer of control from the code cache 130 to the interpreter 110. The original target of the exiting branch may be encoded as part of the trampoline block to communicate it to the interpreter 110. To identify the actual branch target upon exit from the code cache 130, the interpreter 110 can simply extract it from the trampoline block.

Figure 2:
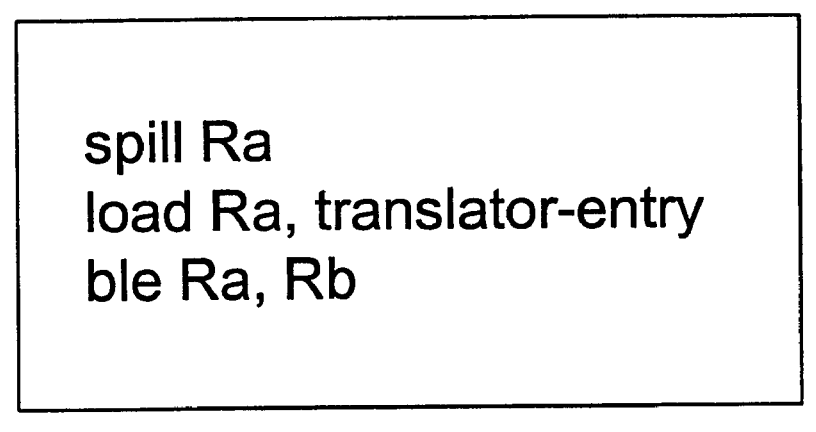

FIG. 2 shows an example of a trampoline block in a PA-RISC architecture. In the sequence of instructions for the trampoline block shown in FIG. 2, the first instruction spills a register Ra, which stores the value of register Ra in memory and clears the register Ra so that it can be loaded with an address. In the second instruction, the register Ra is loaded with the address of the entry point of the interpreter 110, "translator-entry." The load instruction is followed by a branch-and-link-external branch that transfers control to the address contained in register Ra, and sets register Rb as the link register. The value contained in the link register Rb provides the interpreter 110 with "come from" information, which points back to the trampoline block from which control just exited. In particular, the value in the link register Rb contains the address of the instruction that immediately follows the branch-and-link instruction.

Branch and link instructions are typically used to implement procedure calls. Since a procedure may be called from many different places in a program, the recording of the return address in the link register Rb allows the called procedure to return to the place where the current instance of the procedure call was called. In the case of using a trampoline block to trap execution to the interpreter 110, execution is not returned to the trampoline block. Rather, the "come-from" information in the link register Rb is passed to the interpreter 110 so that the interpreter knows from which trampoline execution just exited.

The sequence of instructions for the trampoline block associated with each potential exit branch may be a standard template of instructions, such as shown in FIG. 2. Such a standard template may be used for every branch instruction in the code cache, so that every branch targets a unique trampoline block.

As discussed above, every branch that exits a fragment may be set up to jump to a unique trampoline block associated with the branch to trap control back to the interpreter 110. Implementing such a trap involves saving the context of the program's instructions executing within the code cache 130 prior to jumping to the entry point of the interpreter 110. Since the context switch adds to the overall overhead, it is preferable to keep the overhead low. One way to keep the overhead low without relying on any hardware support is to short circuit exit branches whose targets are present in the code cache 130.

If the actual target of a branch instruction is currently in the code cache 130, the exiting branch may be linked directly to the target fragment and future executions of the branch may bypass the trampoline block. By directly interlinking the fragments in the code cache 130, it is possible to minimize the amount of context switching that is necessary each time execution exits the code cache 130 through a trampoline block. Directly linking or "backpatching" a fragment that targets another fragment currently in the code cache 130 bypasses the original trampoline block and expensive context switches.

Linking between fragments can be effected by replacing the exit branch instruction on the fragment with another branch instruction whose taken target is another fragment's entry point instead of its original trampoline block. Subsequent executions of the branch, when taken, will go directly to the target fragment, bypassing its trampoline block entirely. The branch is now termed as linked. Linking may also be referred to as "translation chaining" in dynamic translator implementations.

When a new fragment is added to the code cache 130, two sets of branches may be linked: (i) exit branches in the new fragment; and (ii) exit branches from other fragments that target the new fragment's entry address. Data structures may be used to store information regarding the new fragment's exit branches and information regarding incoming branches from other fragments. In particular, every branch that can exit a fragment may have a link record structure associated with it that is preferably created prior to emitting the fragment code into the code cache 130. The link record may include the branch instruction's address in the code cache 130, its original target address before it was modified to jump to its trampoline block, the address of its trampoline block, the type of branch, the fragment the branch belongs to, and various flags indicating its linkage status. All link records may be maintained as part of a central fragment lookup table, which is a hash table that is used by the interpreter 110 to check for hits in the code cache 130.

Entries in the fragment lookup table may be indexed using a fragment's entry point as a hash key. Each entry may include information about the fragment including its size, the address of its entry point in the code cache 130 the address of the fragment in the original program before being stored in the code cache 130. Each entry in the fragment lookup table may also include two lists: an exit branch list and an incoming branch list. Each entry in these lists is a pointer to a link record, which contains information about a specific branch in the code cache 130. There is a one-to-one mapping between fragment exit branches and link records.

Figure 3A:
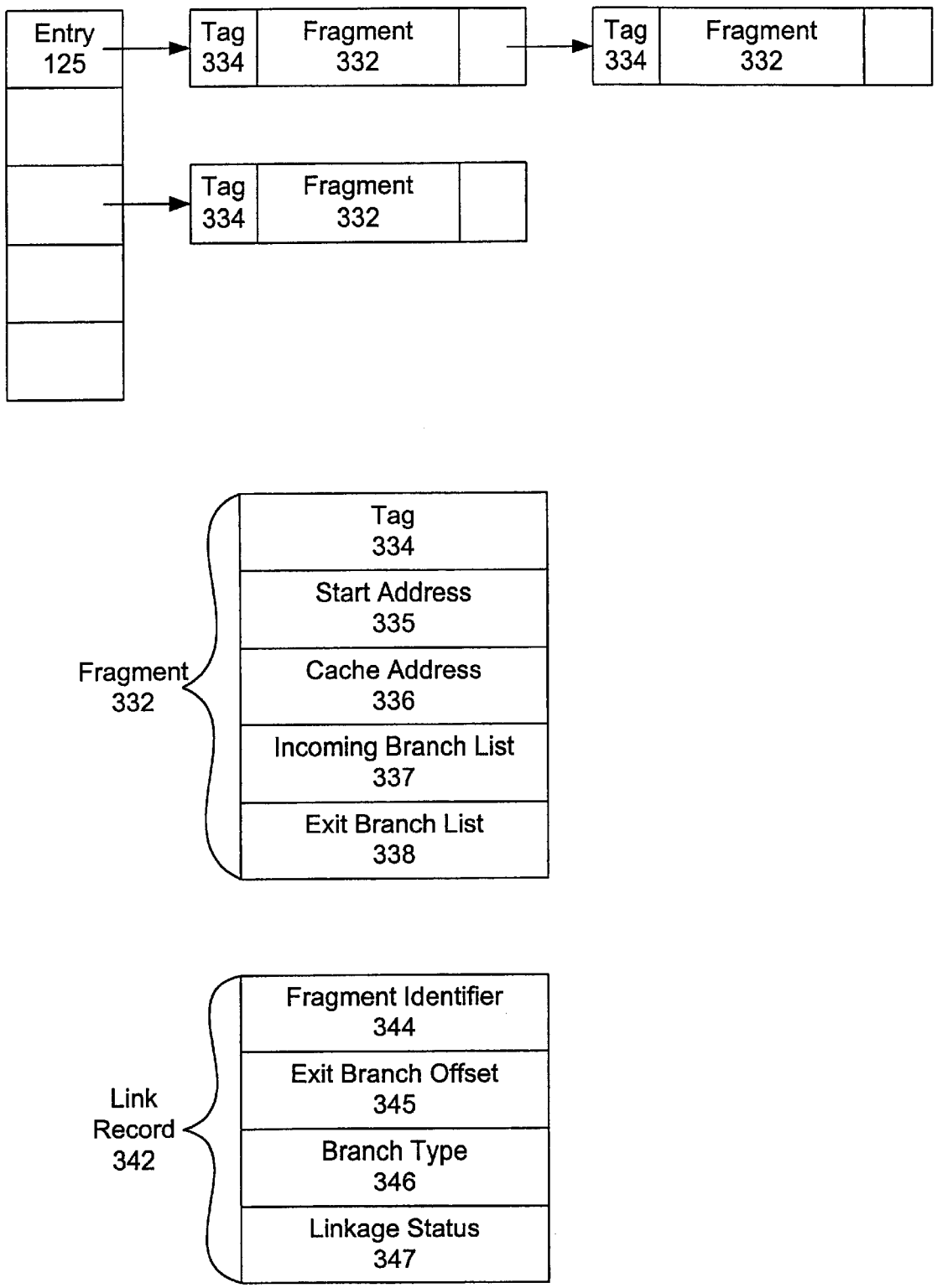
FIG. 3a shows an example of a fragment lookup table and link record consistent with the present invention.

FIG. 3a is an example of a fragment lookup table and link record consistent with the present invention. As shown in FIG. 3a, a fragment lookup table 315 includes a plurality of entries 325. At each entry 325 in the table 315, there may be one or more fragments 332. Each fragment 332 is indexed at an entry 325 by a tag 334. The tag 334 is a unique identifier for a fragment 332.

In addition to the tag 334, each fragment 332 includes a start address 335, a cache address 336, an incoming branch list 337 and an exit branch list 338. The start address 335 is the start address of the fragment 332 before it is stored in the code cache 130, and the cache address 336 is the entry address of the fragment 332 in the code cache 130. The incoming branch list 337, as discussed above, is a list of link records for exit branches that target the entry address of the fragment 332. The exit branch list 338, as discussed above, is a list of link records for exit branches in the fragment indicating the entry addresses targeted by the exit branches.

In the incoming branch list 337 and the exit branch list 338 are a series of link records 342, which include information about the exit branches that are branching to and from the fragment 332. As shown in FIG. 3a, each link record includes a fragment identifier 344, and exit branch offset 345, a branch type 345, and a linkage status 347. Other fields may also be included in the link record 342, as discussed above. The fragment identifier 344 identifies the fragment to which the link record belongs, i.e., the fragment in which the exit branch is present. The exit branch offset 345 identifies the target of the exit branch. The branch type 346 indicates the type of branch as being direct or indirect. The linkage status 347 indicates whether or not the exit branch is currently linked.

Figure 3B:
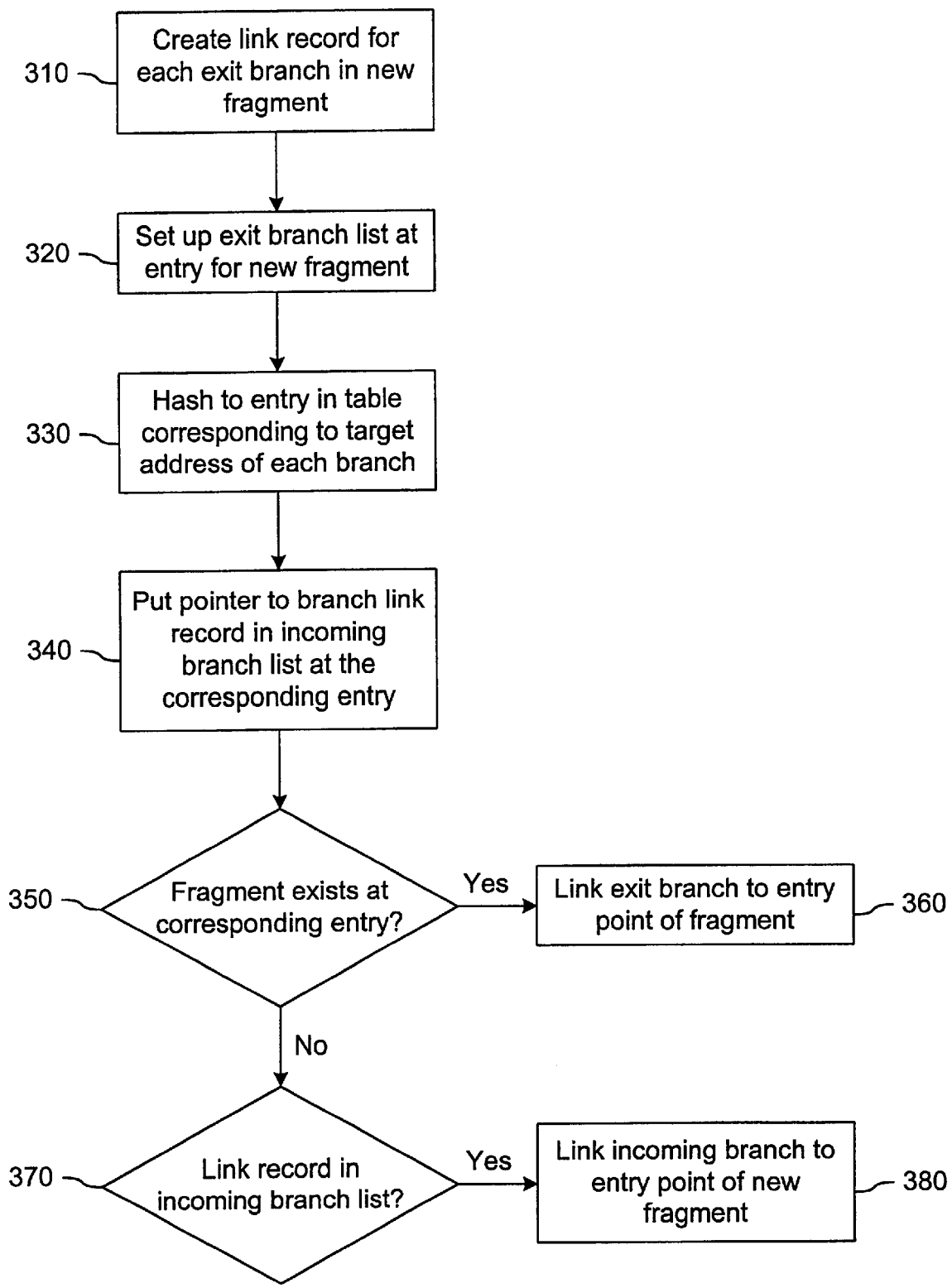
FIG. 3b shows a flow diagram of a process for updating a fragment lookup table consistent with the present invention.

When the code generator 140 emits code for a new fragment into the code cache 130, it updates the fragment lookup table. FIG. 3b is a flow diagram of a fragment lookup table update process consistent with the present invention. As shown in FIG. 3b, after emitting a new code fragment into the code cache 130, a new link record 342 is created and initialized for each exit branch in the new fragment (step 310). At an entry 325 in the fragment lookup table 315 corresponding to the new fragment, an exit branch list 338 is set up that chains the link records 342 for each of the exit branches in the new fragment (step 320). The address of the fragment's entry point in the code cache 130 is also initialized in an entry 325 in the fragment lookup table 315.

For each exit branch in the new fragment, its original target address, which is found in its link record 342, is used to hash into a corresponding 325 entry in the fragment lookup table 315 (step 330). The corresponding entry 325 may or may not contain a fragment in the code cache 130. In either case, a pointer to the exit branch's link record 342 is added to the incoming branch list 337 associated with the corresponding entry 325 in the table 315 (step 340). If such a list is not already there, a new one is created. This step registers the exit branch as one of the incoming branches that may be linked in the future if a fragment is added at the corresponding entry in the fragment lookup table 315.

It is then determined whether a fragment already exists at the corresponding entry 325 (step 350). If so, the exit branch may be linked immediately to the entry point of the fragment at the corresponding entry 325 (step 360). If a fragment does not already exist at the corresponding entry, it may be linked when a fragment is stored in the table 315 at the corresponding entry 325. It is also determined whether any link records are present in the incoming branch list 337 associated with the entry 325 for the new fragment in the fragment lookup table 315 (step 370). The link records 342 in the incoming branch list 337 correspond to the branches that are registered as targeting the entry address of the new fragment. If a link record 342 is present, the corresponding branch may be linked to the entry point of the new fragment (step 380).

The target address of a direct branch is known when the fragment is formed, so linking a direct branch is straightforward. Linking may be effected by replacing the original direct branch instruction, which targets a unique trampoline block at the end of its fragment, with another that targets a fragment entry point within the code cache 130.

The original direct branch may be a conditional branch, such as a compare-and-branch instruction, or it may be an unconditional branch. An unconditional branch can arise in one of two situations on the fragment. The first case is when it is in the shadow or delay slot of an instruction that can potentially nullify its shadow. In this case, the pair of instructions with the unconditional branch in the shadow behaves as a conditional branch.

The second case is at the end of the fragment body. The trace optimizer 150 generates an unconditional branch at the end of a fragment body if it does not already end in a branch instruction. This unconditional branch traps control when it falls off the end of the fragment in the same way that control must be trapped when executing a fragment exit branch. The linking process itself does not distinguish between any of these cases. Although the linking of a conditional branch is potentially complicated by its restricted reachability, this problem does not arise in the case of an unconditional branch. In a PA-RISC architecture, conditional branches have an 11-bit displacement, and can thus have only a 2 KB extent, which may not be enough to reach the intended target fragment within the code cache 130.

If the target fragment is more than 2 KB away from the branch, a landing pad is required to perform the long jump. The unique trampoline block corresponding to the branch may be used to store the landing pad because the moment a branch is linked, its trampoline block becomes dead code. In the case of such a trampoline-based link, the original branch is not modified. Rather, its trampoline block (the current branch target) is modified to serve as a landing pad to get it to the target fragment. If the target fragment is within 32 KB of the trampoline block, an unconditional direct branch can be used to overwrite the first trampoline instruction. Unconditional direct branches have a 15-bit displacement on the PA-RISC architecture. If the target fragment is beyond 32 KB, a two instruction sequence consisting of a load of the target fragment address into a scratch register followed by a branch to the contents of this register may be used. On the PA-RISC architecture, a load immediately followed by a branch-and-link that uses gr0 (the bit bucket) as its link register may be used.

Once the linking is done, the linkage status flags in the link record corresponding to the linked branch are updated. These flags indicate whether or not the branch is currently linked, as well as the type of linking that was done (direct versus trampoline-based link), and in the case of a trampoline-based link, whether the one or two-instruction sequence was used. These flags help to speed up unlinking, which is the reverse of linking. Since linking a branch involves writing into the code cache 130, the modified location has to be synced up with the underlying processor's instruction cache. As a result, the instruction cache line to which the modified branch instruction address maps may be invalidated by doing a line flush.

The target of an indirect branch can only be determined when the branch is executed at runtime. The trace optimizer 150 converts an indirect branch to a conditional compare-and-branch that tests if the current target is equal to the inlined target., i.e., the very next instruction in the fragment. The inlined target is the indirect branch target that was encountered at the instant that the trace corresponding to this fragment was formed. If the targets are not equal, the conditional branch jumps to its trampoline block and exits the code cache 130. Otherwise, it falls through to the inlined target on the same fragment.

The conditional branch is preferably linked to a special fragment that is permanently resident in the code cache 130. This special fragment may be implemented as a hand-coded lookup code that accesses the fragment lookup table to see if there is a fragment corresponding to the actual indirect branch target. If the lookup succeeds, control jumps to the top of the appropriate target fragment. Otherwise, it jumps to the context switch routine that eventually transfers control back to the interpreter 110. A link record is created for the conditional branch that tests the inlined target, just as with any other direct branch. Thus, only direct exit branches are present in the fragment, so the actual mechanics of linking and unlinking is the same for all exit branches on a fragment.

When control returns to the interpreter 110 from the code cache 130, it needs to know the next program PC that has to be executed. In addition, some of the trace selection schemes also need to know the fragment from which control just exited the code cache 130. Thus, "come-from" information is preferably provided to the interpreter 110 in addition to "go-to" information. This information is maintained in the link record. Since there is a unique link record for each exit branch, and also a unique trampoline block for each exit branch, the two structures can be coupled together to enable the trampoline block to communicate a pointer to its associated link record to the interpreter 110 so that the interpreter 110 can then access the link record to determine all necessary come-from and go-to information.

To implement this coupling, the trampoline block may end with a branch-and-link instruction that jumps to a context save routine as shown in FIG. 2, which then jumps to the entry point of the interpreter 110. The advantage of using a branch-and-link instruction instead of a regular branch is that the link register implicitly records an address in the neighborhood of the trampoline block. In the PA-RISC architecture, the link point is 8 bytes (2 instructions) past the branch-and-link instruction itself. All branches, including the branch-and-link instruction in the PA-RISC architecture have a shadow slot (or delay slot) that can be optionally nullified if the branch takes. This shadow slot is used to embed a pointer to the link record associated with the exit branch instruction corresponding to the trampoline block, and the branch-and-link instruction is set up to always nullify this shadow. This strategy of embedding a link record pointer will also work on machines that do not have a branch shadow slot, because control never "returns" to a trampoline block. Thus, the "instruction" following the branch-and-link can never be executed.

The context save routine may be written in assembler and know about the dedicated link register used in the trampoline template. Since the program's value of the link register is saved into the context as part of the trampoline sequence as shown in FIG. 2, the context save routine does not save it to the context data structure. Instead, it saves the contents of this link register into a special part of the context data structure that is designated for the link record address, and the interpreter 110 reads this value to pick up the link record pointer corresponding to the most recent branch that exited the code cache 130. In this way, when control traps to the interpreter 110 upon an exit from the code cache 130, the interpreter knows exactly which branch instruction caused the exit, and what the original program PC of its target was.

Figure 4:
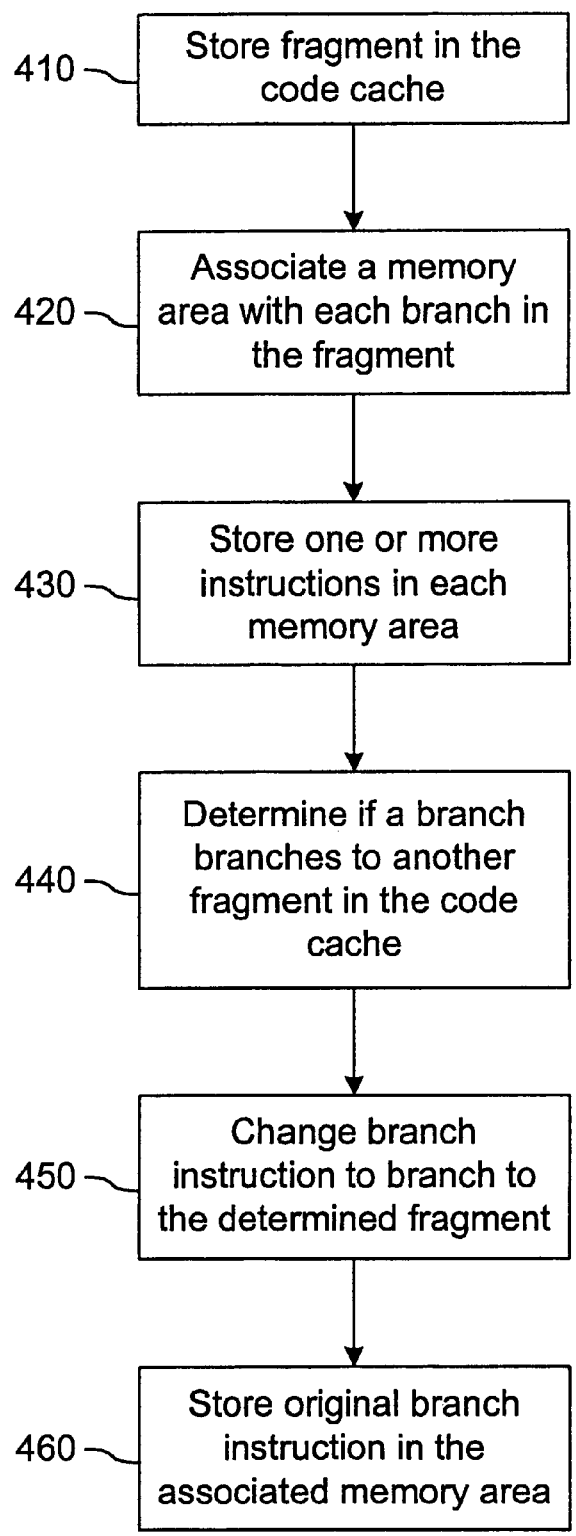
FIG. 4 shows a flow diagram of a process for linking fragments in a code cache consistent with the present invention.

FIG. 4 is a flow diagram for linking fragments in a code cache consistent with the present invention. As shown in FIG. 4, a fragment is first stored in the code cache 130 (step 410). As discussed above with respect to FIG. 1, a fragment may be emitted into the code cache 130 by the code generator 140 after the trace optimizer 150 optimizes a series of instructions traced by the trace selector 120. When the fragment is emitted into the code cache 130, link records are generated and stored in the fragment lookup table as discussed above with respect to FIG. 3b.

In addition to generating the link record information stored in the fragment lookup table, a memory area is associated with each branch in the fragment (step 420). This memory area is preferably implemented as a trampoline block. As discussed above, the trampoline block may be used to trap control from the code cache 130 back to the interpreter 110. One or more instructions are then stored in the memory area associated with each branch in the fragment (step 430). When the memory area is implemented as a trampoline block, the instructions stored in the memory area may be a standard template of instructions, such as shown in FIG. 2.

Figure 5:
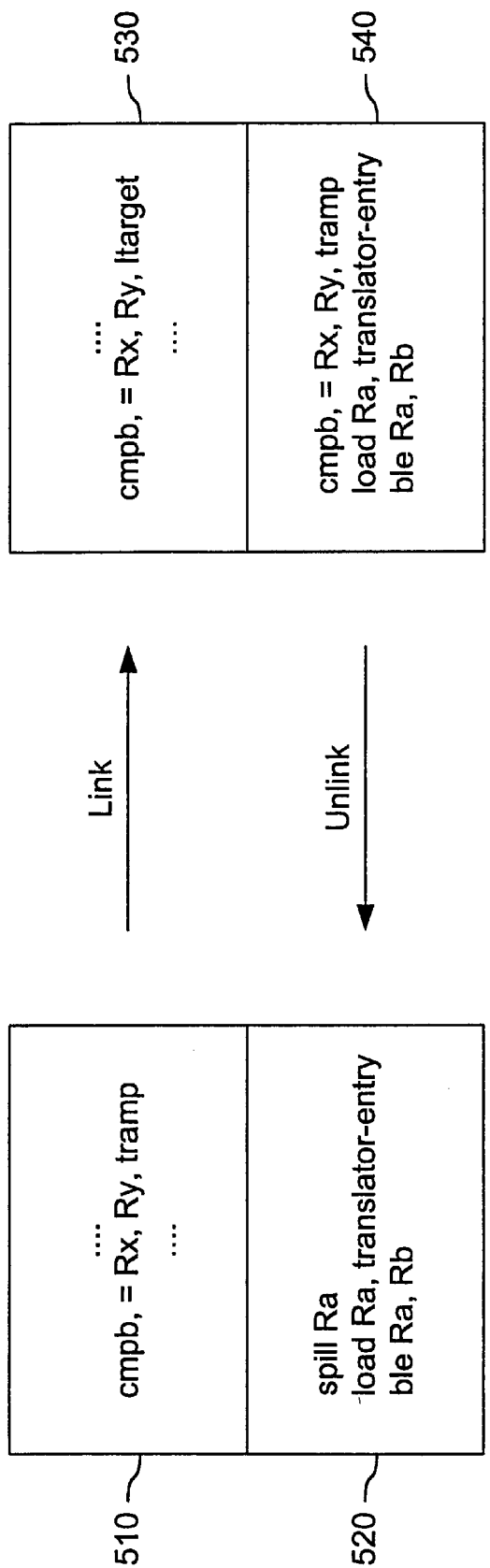
FIG. 5 is an example of a branch and associated trampoline block after linking and after unlinking consistent with the present invention.

FIG. 5 shows an example of a branch instruction with an associated memory with an associated memory area implemented as a trampoline block. As shown in FIG. 5, an original branch instruction 510 acts as a compare and branch if equal instruction. The comparison is between the values in registers Rx and Ry. The value "tramp" in the branch instruction 510 is the address of a trampoline block 520 associated with the branch instruction 510. The trampoline block 510 includes the same template of instructions as those shown in FIG. 2. The branch instruction 530 and instruction sequence 540 will be discussed below in regards to linking and unlinking.

After associating a memory area with each branch and storing the instructions in each one, it is determined whether an exit branch in the fragment branches to another fragment in the code cache 130 (step 440). This determination is also made for exit branches from other fragments in the code cache 130 that target the fragment just emitted into the code cache 130. These determinations may be made by referencing the information stored in the fragment lookup table, as discussed above with respect to FIG. 3b. In particular, for each exit branch, the target of the branch is used as a hash into the fragment lookup table to determine if a fragment is present at the entry located with the hash. In addition, the fragment table is referenced to determine if there are any exit branches designated in the incoming branch list corresponding to the entry for the fragment just emitted into the code cache 130.

If an exit branch does target the entry point of a fragment in the code cache 130, the original branch instruction for that exits branch is changed to branch to the determined fragment (step 450). In addition, the original branch instruction is copied into the associated memory area (step 460).

Referring to FIG. 5, the branch instruction 530 and instruction sequence 540 show the changes made to the original branch instruction 510 and the trampoline block 520 after linking. As shown in FIG. 5, the original branch instruction 510 is copied over the top of the first instruction in the trampoline block 520, which results in the instruction sequence 540. In addition, the original branch instruction 510 is replaced by the branch instruction 530 whose target address is set to the entry point address of the fragment determined in step 440. As will be discussed below, copying the original branch instruction into the associated memory area allows the dynamic translator to perform fast unlinking between branches and entry points of fragments.

While the advantage of linking is clear, there are also some challenges associated with linking. For example, linking makes the removal of an arbitrary fragment from the code cache 130 more expensive because all incoming linked branches to the fragment have to be unlinked. Linking also makes it expensive to relocate linked fragments in the code cache 130, which might be desirable when periodically de-fragmenting the code cache 130 storage.

Another problem with linking is that it makes it harder to bound the latency of asynchronous signal handling. Asynchronous signals arise from events like keyboard interrupts and timer expiry, and their handling is postponed until control exits from the code cache 130. When an asynchronous signal arrives, the signal handling component of the dynamic translator adds it to a pending signal queue and continues execution in code cache 130. When control eventually exits the code cache 130, the interpreter 110 first checks the pending signal queue and processes all the pending asynchronous signals. When fragments are linked, however, the time interval between the arrival of such a signal and when the interpreter 110 gets to process it can be arbitrarily long because of loops within the code cache 130. Preventing this loop is especially important in systems that require at least a soft real time response to asynchronous signals.

Unlinking of fragments, which is the reverse of branch linking, is preferably executed as a very fast operation so that all linked branches in a given fragment can be quickly unlinked at any time. In one aspect of the present invention, unlinking may involve the re-materialization of an original exit branch instruction and its associated trampoline block to trap control into the interpreter 110 instead of going directly to a target fragment in the code cache 130 when the branch is taken. Unlinking is preferably executed in two situations:

(i) for fragment deletion from the code cache 130; and (ii) for bounding the latency of signal handling in systems that rely on a soft real-time response to signals. Other situations may also call for unlinking of fragments in the code cache 130.

Fragments may get removed from the code cache 130 in order to free up more room or for purposes of forcing a re-formation of the fragment. In either event, when a fragment is removed, branches from the fragment and incoming branches from other fragments have to be unlinked.

To bound the latency of asynchronous signal handling, all exit branches in the current (executing) fragment may be unlinked before execution is resumed in the code cache 130 in response to an asynchronous signal. If a soft real time response is a requirement, trampoline blocks and link records can also be generated for backward branches that go to the top of their own fragments (i.e., self-loops). This allows even self-loops to be unlinked upon arrival of an asynchronous signal. Unlinking these branches on the current fragment forces an exit from the code cache 130 at the next taken branch. Since fragments are preferably no longer than 1024 instructions, this strategy bounds the latency between signal arrival and signal delivery.

Figure 6:
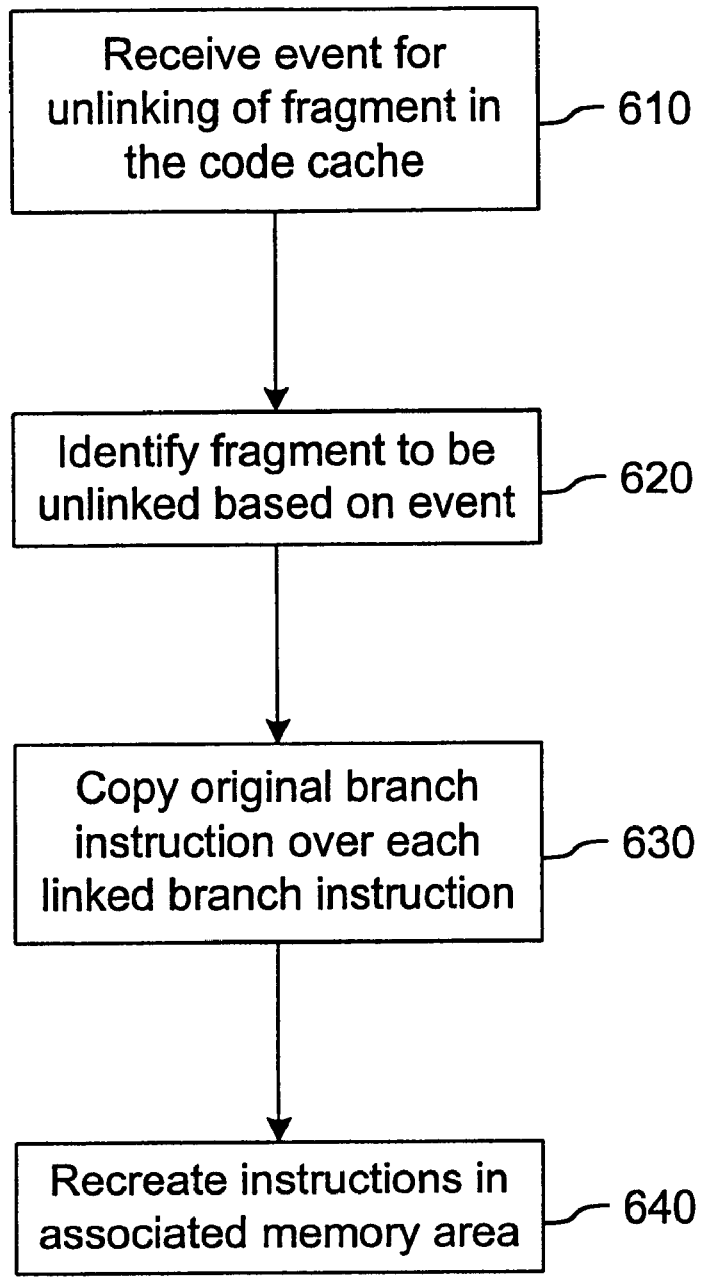
FIG. 6 shows a flow diagram of a process for unlinking fragments in a code cache consistent with the present invention.

FIG. 6 is a flow diagram of an unlinking process consistent with the present invention. As shown in FIG. 6, an event is received that calls for the unlinking of a fragment in the code cache 130 (step 610). The event may be, for example, the removal of a fragment from the code cache 130 or the reception of an asynchronous signal. Based on the event, the fragment to be unlinked is identified (step 620). If a fragment is being removed, then all links to and from that fragment are unlinked. If an asynchronous signal is received, then the current fragment, which is the fragment in which instructions are currently being executed, is unlinked.

To unlink the identified fragment, the original branch instruction of each exit branch in the identified fragment is copied over the branch instructions set to target a fragment in the code cache 130 (step 630). As discussed above with respect to FIG. 4, when an exit branch is linked to an entry point of a fragment in the code cache 130, the original branch instruction may be copied into the memory area associated with the exit branch, which is preferably a trampoline block, and the original branch instruction is then modified to target the entry point of the fragment in the code cache 130. To unlink the branch to the fragment in the code cache 130, the original branch instruction stored in the trampoline block is copied over the branch instruction targeting another fragment in the code cache 130.

The associated memory area is then recreated to its original form (step 640). When the associated memory area is implemented as a trampoline block, it may be recreated by copying a template of the instructions for the trampoline block, such as the instructions shown in FIG. 2, from a known location in memory to the location of the trampoline block in the code cache 130. By changing the exit branch back to the original branch instruction and recreating the template of instructions in the trampoline block, the exit branch is returned to its original state before the exit branch was linked.

The example in FIG. 5 shows the results of the unlinking process of FIG. 6. As shown in FIG. 5, the branch instruction 530 and the instruction sequence 540 illustrate the state of the instructions in the fragment after linking the branch instruction 530 to the entry point of a fragment in the code cache 130. In instruction sequence 540, the first instruction is a copy of the original instruction 510 before the linking.

To reconstruct the original branch instruction 510 and the trampoline block 520, the first instruction in the instruction sequence 540 is copied over the branch instruction 530, which reproduces the original branch instruction 510. In addition, a template of instructions from a known location in memory is copied over the instructions in the instruction sequence 540 to reproduce the trampoline block 520.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. In a dynamic translator in which code fragments are stored in a cache, a method for linking and unlinking a first code fragment and a second code fragment stored in the cache, comprising:

associating a memory area with a branch in a first code fragment that branches outside of the cache;

storing at least one instruction in the memory area that is executed when the branch is taken and control is to transfer to code outside of the cache;

determining that the branch can be set to branch to a location in a second code fragment stored in the cache;

changing the branch so that it branches to the second code fragment stored in the code cache, thereby linking the first and second code fragments; and adding information to the associated memory area corresponding to the branch in its state before being changed to link the first and second code fragments.

2. The method of claim 1, further comprising:

determining that the branch from the first code fragment to the second code fragment should be unlinked; and reconstructing the branch to its state before linking based on the information stored in the associated memory area.

3. The method of claim 2, further comprising:

reconstructing the at least one instruction in the associate memory area with a template of one or more instructions stored in a location in memory.

4. The method of claim 2, wherein it is determined that the branch should be unlinked in response to the reception of an asynchronous signal.

5. The method of claim 1, wherein the adding in the associated memory area step includes overwriting information used when the memory area is used to transfer control out of the cache.

6. The method of claim 1, wherein the adding in the associated memory area step includes overwriting an instruction used when the memory area is used to transfer control out of the cache with a copy of the branch instruction.

7. The method of claim 1, wherein the first code fragment and the second code fragment are different fragments stored in the cache.

8. The method of claim 1, wherein the first code fragment and the second code fragment are the same fragment stored in the cache.

9. The method of claim 1, further comprising:

receiving an asynchronous signal; and unlinking the first and second code fragments if the asynchronous signal is received during the execution of either the first code fragment or the second code fragment.

10. A method for linking and unlinking code fragments stored in a code cache, comprising the steps of:

associating a memory area with a branch in a first code fragment that branches outside the cache;

determining that the branch can be set to branch to a location in a second code fragment stored in the cache;

updating the branch to branch to the determined location in the second code fragment, thereby linking the first code fragment to the second code fragment; and adding branch reconstruction information to the associated memory area corresponding to the branch in its state before being updated to link the first and second code fragments.

11. The method of claim 10, further comprising:

determining that that previously linked branch should be unlinked; and unlinking the first and second code fragments at that branch by reading the information stored in the associated memory area at the time of linking, and using that information to reset the branch to its state prior to the linking.

12. The method of claim 10, wherein the memory area includes code that is used to transfer control out of the code cache when the associated branch is taken.

13. The method of claim 10, wherein the branch reconstruction information is a copy of the branch, and wherein the reconstruction information is added to the memory area so as to overwrite code that is used to handle the branch when it branches out of the cache.

14. The method of claim 10, wherein the memory area includes code that is used to transfer control out of the code cache when the associated branch is taken, at least a portion of the code corresponding to a template that is independent of the particular associated branch, and wherein the adding of branch reconstruction information in the associated memory area when the branch is linked into the cache includes storing branch information that overwrites information in that portion.

15. The method of claim 14, wherein the unlinking includes replacing the overwritten template information.

16. The method of claim 10, further comprising:

receiving an asynchronous signal; and unlinking the first and second code fragments if the asynchronous signal is received during the execution of either the first code fragment or the second code fragment.

17. A code cache controller for linking and unlinking a first code fragment and a second code fragment stored in a cache, comprising:

a first component for associating a memory area with a branch in a first code fragment that branches outside of the cache;

a second component for storing at least one instruction in the memory area that is executed when the branch is taken and control is to transfer to code outside of the cache;

a third component for determining that the branch can be set to branch to a location in a second code fragment stored in the cache;

a fourth component for changing the branch so that it branches to the second code fragment stored in the code cache, thereby linking the first and second code fragments; and a fifth component for adding information to the associated memory area corresponding to the branch in its state before being changed to link the first and second code fragments.

18. The code cache controller of claim 17, further comprising:

a sixth component for determining that the branch from the first code fragment to the second code fragment should be unlinked; and a seventh component for reconstructing the branch to its state before linking based on the information stored in the associated memory area.

19. The code cache controller of claim 18, wherein the seventh component includes a sub-component for reconstructing the at least one instruction in the associate memory area with a template of one or more instructions stored in a location in memory.

20. The code cache controller of claim 17, wherein the fifth component includes a sub-component for overwriting information used when the memory area is used to transfer control out of the cache.

21. The code cache controller of claim 17, wherein the fifth component includes a sub-component for overwriting an instruction used when the memory area is used to transfer control out of the cache with a copy of the branch instruction.

22. The code cache controller of claim 17, wherein the first code fragment and the second code fragment are different fragments stored in the cache.

23. The code cache controller of claim 17, wherein the first code fragment and the second code fragment are the same fragment stored in the cache.

24. The code cache controller of claim 17, further comprising:

a sixth component for receiving an asynchronous signal; and a seventh component for unlinking the first and second code fragments if the asynchronous signal is received during the execution of either the first code fragment or the second code fragment.

25. A code cache controller for linking and unlinking code fragments stored in a code cache, comprising:

a first component for associating a memory area with a branch in a first code fragment that branches outside the cache;

a second component for determining that the branch can be set to branch to a location in a second code fragment stored in the cache;

a third component for updating the branch to branch to the determined location in the second code fragment, thereby linking the first code fragment to the second code fragment; and a fourth component for adding branch reconstruction information to the associated memory area corresponding to the branch in its state before being updated to link the first and second code fragments.

26. The code cache controller of claim 25, further comprising:

a fifth component for determining that that previously linked branch should be unlinked; and a sixth component for unlinking the first and second code fragments at that branch by reading the information stored in the associated memory area at the time of linking, and using that information to reset the branch to its state prior to the linking.

27. The code cache controller of claim 25, wherein the memory area includes code that is used to transfer control out of the code cache when the associated branch is taken.

28. The code cache controller of claim 25, wherein the branch reconstruction information is a copy of the branch, and wherein the reconstruction information is stored in the memory area so as to overwrite code that is used to handle the branch when it branches out of the cache.

29. The code cache controller of claim 25, wherein the memory area includes code that is used to transfer control out of the code cache when the associated branch is taken, at least a portion of the code corresponding to a template that is independent of the particular associated branch, and wherein the fourth component includes a sub-component for storing branch information that overwrites information in that portion.

30. The code cache controller of claim 29, wherein the sixth component includes a sub-component for replacing the overwritten template information.

31. The code cache controller of claim 25, further comprising:

a sixth component for receiving an asynchronous signal; and a seventh component for unlinking the first and second code fragments if the asynchronous signal is received during the execution of either the first code fragment or the second code fragment.

32. A computer-readable medium configured to control the operation of a computer to linking and unlink a first code fragment and a second code fragment stored in a cache, the computer-readable medium configured to:

associate a memory area with a branch in a first code fragment that branches outside of the cache;

store at least one instruction in the memory area that is executed when the branch is taken and control is to transfer to code outside of the cache;

determine that the branch can be set to branch to a location in a second code fragment stored in the cache;

change the branch so that it branches to the second code fragment stored in the code cache, thereby linking the first and second code fragments; and add information to the associated memory area corresponding to the branch in its state before being changed to link the first and second code fragments.

33. The computer readable medium of claim 32, further configured to:

determine that the branch from the first code fragment to the second code fragment should be unlinked; and reconstruct the branch to its state before linking based on the information stored in the associated memory area.

34. The computer readable medium of claim 33, further configured to reconstruct the at least one instruction in the associate memory area with a template of one or more instructions stored in a location in memory.

35. The computer readable medium of claim 32, further configured to overwrite information used when the memory area is used to transfer control out of the cache.

36. The computer readable medium of claim 32, further configured to overwrite an instruction used when the memory area is used to transfer control out of the cache with a copy of the branch instruction.

37. The computer readable medium of claim 32, wherein the first code fragment and the second code fragment are different fragments stored in the cache.

38. The computer readable medium of claim 32, wherein the first code fragment and the second code fragment are the same fragment stored in the cache.

39. The computer readable medium of claim 32, further configured to:
   receive an asynchronous signal; and
   unlink the first and second code fragments if the asynchronous signal is received during the execution of either the first code fragment or the second code fragment.

40. A computer-readable medium configured to control the operation of a computer to linking and unlink a first code fragment and a second code fragment stored in a cache, the computer-readable medium configure to:
   associate a memory area with a branch in a first code fragment that branches outside the cache;
   determine that the branch can be set to branch to a location in a second code fragment stored in the cache;
   update the branch to branch to the determined location in the second code fragment, thereby linking the first code fragment to the second code fragment; and
   add branch reconstruction information to the associated memory area corresponding to the branch in its state before being updated to link the first and second code fragments.

41. The computer readable medium of claim 40, further configured to:
   determine that that previously linked branch should be unlinked; and
   unlink the first and second code fragments at that branch by reading the information stored in the associated memory area at the time of linking, and using that information to reset the branch to its state prior to the linking.

42. The computer readable medium of claim 40, wherein the memory area includes code that is used to transfer control out of the code cache when the associated branch is taken.

43. The computer readable medium of claim 40, wherein the branch reconstruction information is a copy of the branch, and wherein the reconstruction information is added to the memory area so as to overwrite code that is used to handle the branch when it branches out of the cache.

44. The computer readable medium of claim 40, wherein the memory area includes code that is used to transfer control out of the code cache when the associated branch is taken, at least a portion of the code corresponding to a template that is independent of the particular associated branch, and
   wherein the computer readable medium is further configured to store branch information that overwrites information in that portion.

45. The computer readable medium of claim 44, wherein the sixth component includes a sub-component for replacing the overwritten template information.

46. The computer readable medium of claim 40, further configured to:
   receive an asynchronous signal; and
   unlink the first and second code fragments if the asynchronous signal is received during the execution of either the first code fragment or the second code fragment.

* * * * *